(12) United States Patent
Yang et al.

(10) Patent No.: US 11,858,149 B2
(45) Date of Patent: Jan. 2, 2024

(54) LOCALIZATION OF ROBOT

(71) Applicant: LG ELECTRONICS INC., Seoul (KR)

(72) Inventors: Sookhyun Yang, Seoul (KR); Jungsik Kim, Seoul (KR); Jinuh Joo, Seoul (KR); Hyoungrock Kim, Seoul (KR); Sang Ki Kim, Seoul (KR); Minjung Kim, Seoul (KR); Moonsik Nam, Seoul (KR); Gyuho Eoh, Seoul (KR); Donghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 17/098,832

(22) Filed: Nov. 16, 2020

(65) Prior Publication Data
US 2021/0229291 A1 Jul. 29, 2021

(30) Foreign Application Priority Data
Jan. 28, 2020 (KR) .................. 10-2020-0010095

(51) Int. Cl.
*B25J 9/16* (2006.01)
(52) U.S. Cl.
CPC .......... *B25J 9/1697* (2013.01); *B25J 9/1664* (2013.01)
(58) Field of Classification Search
CPC ........ B25J 9/1697; B25J 9/1664; B25J 9/161; B25J 9/1679; B25J 19/023; G05D 1/0088; G05D 1/0231; G05D 1/0212; G06N 3/02
See application file for complete search history.

(56) References Cited

U.S. PATENT DOCUMENTS

| 11,199,853 | B1* | 12/2021 | Afrouzi | G05D 1/0246 |
| 2017/0083023 | A1* | 3/2017 | Park | G05D 1/024 |
| 2017/0203446 | A1* | 7/2017 | Dooley | G05D 1/0038 |
| 2018/0150972 | A1* | 5/2018 | Zhu | G05D 1/0246 |
| 2018/0173243 | A1* | 6/2018 | Park | G05D 1/0238 |

(Continued)

FOREIGN PATENT DOCUMENTS

CN 107167144 A * 9/2017 .......... G01C 21/206

OTHER PUBLICATIONS

English Machine Translation of CN 107167144A, Accessed May 19, 2022.*

(Continued)

*Primary Examiner* — Jeff A Burke
*Assistant Examiner* — Blake A Wood
(74) *Attorney, Agent, or Firm* — KED & ASSOCIATES, LLP

(57) ABSTRACT

A robot may include an input interface configured to obtain an image of a surrounding environment of the robot, and at least one processor configured to rotate the robot in place for localization, and estimate at least one of a position or a pose in a space, based on a plurality of sequential images obtained by the input interface during the rotation of the robot. The position or the pose of the robot may be estimated based on inputting the plurality of sequential images obtained during the rotation of the robot into a trained model based on an artificial neural network. In a 5G environment connected for the Internet of Things, embodiments of the present disclosure may execute an artificial intelligence algorithm and/or a machine learning algorithm.

13 Claims, 7 Drawing Sheets

(56) References Cited

U.S. PATENT DOCUMENTS

| | | | | |
|---|---|---|---|---|
| 2018/0189565 A1* | 7/2018 | Lukierski | ............... | G06V 20/10 |
| 2019/0005719 A1* | 1/2019 | Fleischman | ............. | G06T 7/579 |
| 2020/0082567 A1* | 3/2020 | Liu | ........................... | G06T 7/75 |

OTHER PUBLICATIONS

Taraglio, S., Di Fonzo, F., & Burrascano, P. (1997). Training data representation in a neural based robot position estimation system (ENEA-RT-INN—97-01). Italy.*

Pessin, Gustavo, et al. "Mobile robot indoor localization using artificial neural networks and wireless networks." Proc. of First Brazilian Conference on Critical Embedded Systems (I CBSEC). 2011.*

T. Krajník, J. P. Fentanes, J. M. Santos and T. Duckett, "FreMEn: Frequency Map Enhancement for Long-Term Mobile Robot Autonomy in Changing Environments," in IEEE Transactions on Robotics, vol. 33, No. 4, pp. 964-977, Aug. 2017, doi: 10.1109/TRO.2017.2665664.*

Alex Kendall et al, "PoseNet: A Convolutional Network for Real-Time 6-DOF Camera Relocalization, ICCV 2015," dated Feb. 18, 2016.

* cited by examiner

LOCALIZATION OF ROBOT

CROSS-REFERENCE TO RELATED APPLICATION

This application claims the benefit of priority to Korean Application No. 10-2020-0010095, filed on Jan. 28, 2020, entitled "LOCALIZATION OF ROBOT," the entire disclosure of which is incorporated herein by reference.

BACKGROUND

1. Field

The present disclosure relates to a robot, and more particularly, to localization of a robot.

2. Background

Various robots that may be conveniently used in daily life have been actively developed. Such robots are used to help people in their daily lives places such as homes, schools, and other public places.

Mobile robots such as guide robots, delivery robots, and cleaning robots perform tasks while driving autonomously without manipulation of a user. In order for a robot to drive autonomously, localization of the robot is necessary. A current position of the robot may be recognized or re-recognized using a map of a space in which the robot operates, and various sensor data.

However, when an unexpected movement of the robot occurs, for example, the robot may be unable to properly recognize its current position or orientation. If the robot does not accurately recognize its current position or orientation, the robot may not provide a service desired by the user.

Relocalization of the robot may be performed by comparing features of images obtained by the robot with features of reference images. Such relocalization based on the images may be accomplished using a deep learning model such as PoseNet, for example. The related information is disclosed in PoseNet: A Convolutional Network for Real-Time 6-DOF Camera Relocalization, ICCV 2015, the subject matter of which is incorporated herein by reference.

When estimating a pose using a trained model, accuracy may be increased by using a plurality of sequential images. However, since an actual path of the robot may not be predicted, there is complexity of requiring the learning of all paths. Additionally, the robot may drive dangerously without identifying its position.

BRIEF DESCRIPTION OF THE DRAWINGS

Arrangements and embodiments of the present disclosure may become apparent from the detailed description of the following aspects in conjunction with the accompanying drawings, in which.

DETAILED DESCRIPTION

A robot may be a machine that automatically handles a given task by its own ability, or that operates autonomously. A robot having a function of recognizing an environment and performing an operation according to its own judgment may be referred to as an intelligent robot. The robot may be classified into industrial, medical, household, and military robot, according to the purpose or field of use.

The robot may include a driver including an actuator or a motor in order to perform various physical operations, such as moving joints of the robot. A movable robot may be equipped with a wheel, a brake, a propeller, and the like to drive on the ground or fly in the air. The robot may be provided with legs or feet to walk two-legged or four-legged on the ground.

Autonomous driving refers to a technology in which driving is performed autonomously, and an autonomous vehicle refers to a vehicle capable of driving without manipulation of a user or with minimal manipulation of a user. For example, autonomous driving may include all of a technology for keeping a driving lane, a technology for automatically controlling a speed such as adaptive cruise control, a technology for automatically driving a vehicle along a determined path, a technology for, if a destination is set, automatically setting a path and driving a vehicle along the path, and the like. A vehicle may include a vehicle having only an internal combustion engine, a hybrid vehicle having both an internal combustion engine and an electric motor, and an electric vehicle having only an electric motor, and may include not only an automobile but also a train, a motorcycle, and the like. The autonomous vehicle may be considered as a robot with an autonomous driving function.

Figure 1:
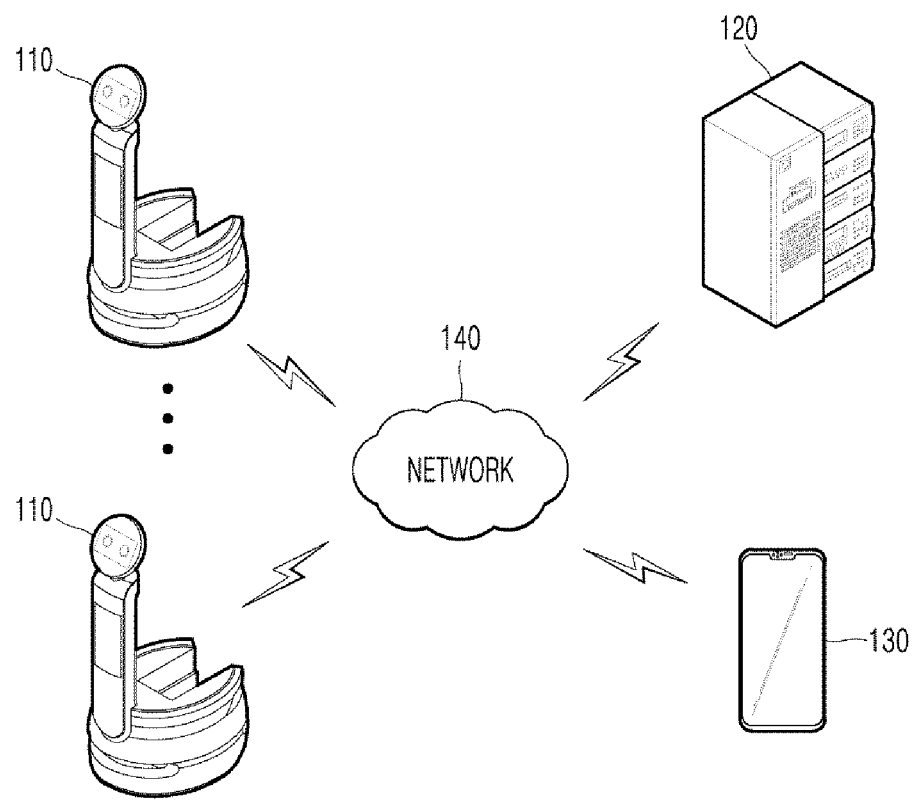
FIG. 1 is a diagram illustrating a robot system according to one embodiment of the present disclosure.

FIG. 1 is a diagram illustrating a robot system according to one embodiment of the present disclosure. The robot system may include one or more robots 110 and a control server 120, and may further include a terminal 130. The one or more robots 110, the control server 120, and the terminal 130 may be connected to each other via a network 140. The one or more robots 110, the control server 120, and the terminal 130 may communicate with each other via a base station, but may also communicate with each other directly without the base station.

The one or more robots 110 may perform a task in a space (or an area), and provide information or data related to the task to the control server 120. A workspace of the robot may be indoors or outdoors. The robot may operate in a space predefined by a wall, a column, and/or the like. The workspace of the robot may be defined in various ways according to the design purpose, working attributes of the robot, mobility of the robot, and other factors. The robot may operate in an open space that is not predefined. The robot may also sense a surrounding environment and determine the workspace by itself.

The one or more robots 110 may provide their state information or data to the control server 120. The state information of the robots 110 may include, for example, information on the robots 110, such as a position, a battery level, durability of parts, replacement cycles of consumables, and the like.

The control server 120 may perform various analysis based on information or data provided by the one or more robots 110, and control an overall operation of a robot system based on the analysis result. In one aspect, the control server 120 may directly control the driving of the robots 110 based on the analysis result. In another aspect, the control server 120 may derive and output useful information or data from the analysis result. In still another aspect, the control server 120 may adjust parameters in the robot system using the derived information or data. The control server 120 may be implemented as a single server, but may be implemented as a set of a plurality of servers, a cloud server, and/or a combination thereof.

The terminal 130 may share the role of the control server 120. In one aspect, the terminal 130 may obtain information or data from the one or more robots 110 and provide the obtained information or data to the control server 120. Alternatively, the terminal 130 may obtain information or data from the control server 120 and provide the obtained information or data to the one or more robots 110. In another aspect, the terminal 130 may be responsible for at least part of the analysis to be performed by the control server 120, and may provide the analysis result to the control server 120. In still another aspect, the terminal 130 may receive, from the control server 120, the analysis result, information, or data, and may simply output the received analysis result, information, or data.

The terminal 130 may take the place of the control server 120 (and/or serve/operate in a manner similar to the control server). At least one robot of the one or more robots 110 may take the place of the control server 120 (and/or serve/operate in a manner similar to the control server). In this example, the one or more robots 110 may be connected to communicate with each other.

The terminal 130 may include various electronic devices capable of communicating with the robots 110 and the control server 120. For example, the terminal 130 may be implemented as a stationary terminal and a mobile terminal, such as a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head-mounted display (HMD)), a set-top box (STB), a digital multimedia broadcast (DMB) receiver, a radio, a laundry machine, a refrigerator, a vacuum cleaner, an air conditioner, a desktop computer, a projector, and a digital signage.

The network 140 may refer to a network that configures a portion of a cloud computing infrastructure or exists in the cloud computing infrastructure. The network 140 may be, for example, a wired network such as local area networks (LANs), wide area networks (WANs), metropolitan area networks (MANs), or integrated service digital networks (ISDNs), or a wireless communications network such as wireless LANs, code division multi access (CDMA), Wideband CDMA (WCDMA), long term evolution (LTE), long term evolution-advanced (LTE-A), 5G (generation) communications, Bluetooth, or satellite communications, but is not limited thereto.

The network 140 may include a connection of network elements such as a hub, a bridge, a router, a switch, and a gateway. The network 140 may include one or more connected networks, for example, a multi-network environment, including a public network such as an Internet and a private network such as a safe corporate private network. Access to the network 140 may be provided through one or more wire-based or wireless access networks. The network 140 may support various types of Machine to Machine (M2M) communications, such as Internet of things (IoT), Internet of everything (IoE), and Internet of small things (IoST), and/or 5G communication, to exchange and process information between distributed components such as objects.

Figure 2:
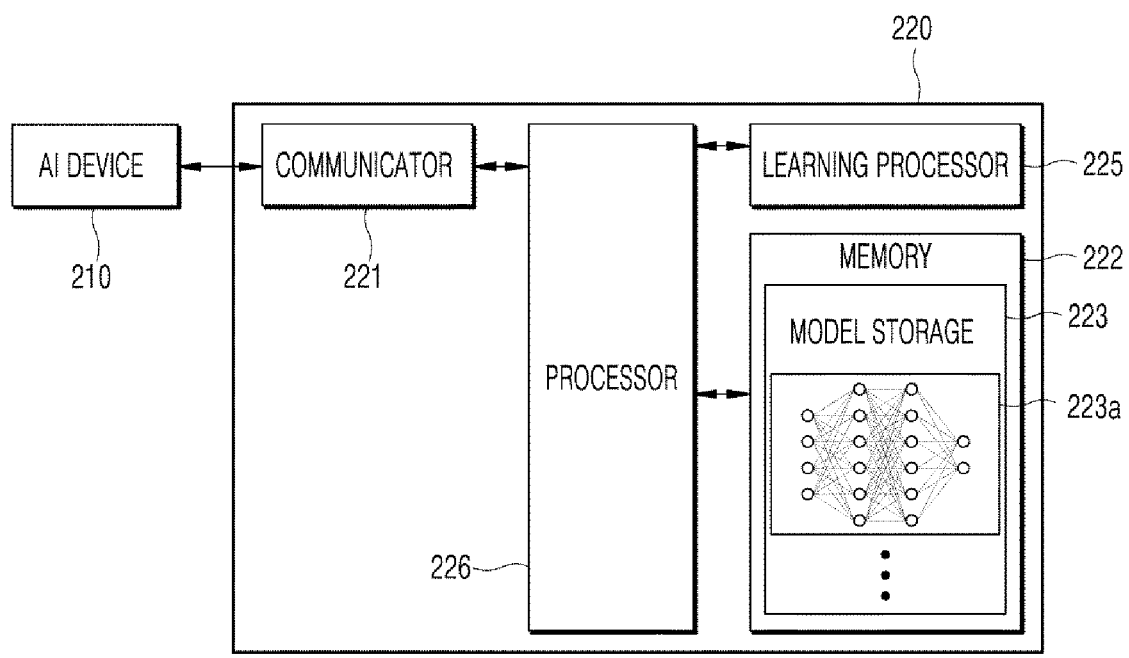
FIG. 2 is a diagram illustrating a configuration of an AI system according to one embodiment of the present disclosure.

FIG. 2 is a diagram illustrating a configuration of an AI system according to one embodiment of the present disclosure. In an embodiment, a robot system may be implemented as an AI system capable of artificial intelligence and/or machine learning. Artificial intelligence refers to a field of studying artificial intelligence or a methodology for creating the same. Machine learning refers to a field of defining various problems dealing in an artificial intelligence field and studying methodologies for solving the same. The machine learning may be defined as an algorithm for improving performance with respect to any task through repeated experience with respect to the task.

An artificial neural network (ANN) is a model used in machine learning, and may refer to a model with problem-solving abilities, composed of artificial neurons (nodes) forming a network by a connection of synapses. The artificial neural network may be defined by a connection pattern between neurons on different layers, a learning process for updating model parameters, and an activation function for generating an output value.

The artificial neural network may include an input layer, an output layer, and/or optionally one or more hidden layers. Each layer may include one or more neurons, and the artificial neural network may include synapses that connect the neurons to one another. In the artificial neural network, each neuron may output a function value of an activation function with respect to the input signals inputted through a synapse, weight, and bias.

The model parameters refer to parameters determined through learning, and may include weights of synapse connection, bias of a neuron, and/or the like. A hyperparameters may refer to parameters which are set before learning in the machine learning algorithm, and may include a learning rate, a number of repetitions, a mini batch size, an initialization function, and the like.

One objective of training the artificial neural network is to determine a model parameter for significantly reducing a loss function. The loss function may be an indicator for determining an optimal model parameter in a learning process of the artificial neural network.

The machine learning may be classified into supervised learning, unsupervised learning, and reinforcement learning depending on the learning method. Supervised learning may refer to a method for training the artificial neural network with training data that has been given a label. The label may refer to a target answer (or a result value) to be inferred by the artificial neural network when the training data is inputted to the artificial neural network. Unsupervised learning may refer to a method for training the artificial neural network using training data that has not been given a label. Reinforcement learning may refer to a learning method for training an agent defined within an environment to select an action or an action order for maximizing cumulative rewards in each state.

Machine learning implemented as a deep neural network (DNN) including a plurality of hidden layers, among artificial neural networks may be referred to as deep learning and the deep learning is one machine learning technique. The meaning of machine learning may include deep learning.

Referring to FIG. 2, the robot system according to one embodiment may include an AI device 210 and an AI server 220. In an embodiment, the AI device 210 may be the robot 110, the control server 120, the terminal 130 of FIG. 1, or the robot 300 of FIG. 3. The AI server 220 may be the control server 120 of FIG. 1.

The AI server 220 may be a device for using a trained artificial neural network or training an artificial neural network using a machine learning algorithm. The AI server 220 may be composed of a plurality of servers to perform distributed processing. The AI server 220 may be included as a configuration of the AI device 210, thereby performing at least some of artificial intelligence and/or machine learning processing with the AI device 210.

The AI server 220 may include a communicator 221 (or a communication device), a memory 222, a learning processor 225, a processor 226, and/or the like. The communicator 221 may transmit or receive data with an external device such as the AI device 210.

The memory 222 may include a model storage 223. The model storage 223 may store a model (or an artificial neural network 223a) that is being trained or was trained by the learning processor 225.

The learning processor 225 may train the artificial neural network 223a using training data. The trained model may be used while mounted in the AI server 220 of the artificial neural network, or may be used while mounted in the external device such as the AI device 210. The trained model may be implemented as hardware, software, and/or a combination of hardware and software. When a portion or all of the trained model is implemented as software, one or more instructions constituting the trained model may be stored in the memory 222. The processor 226 may infer a result value with respect to new input data using the trained model, and may generate a response or control command based on the inferred result value.

Figure 3:
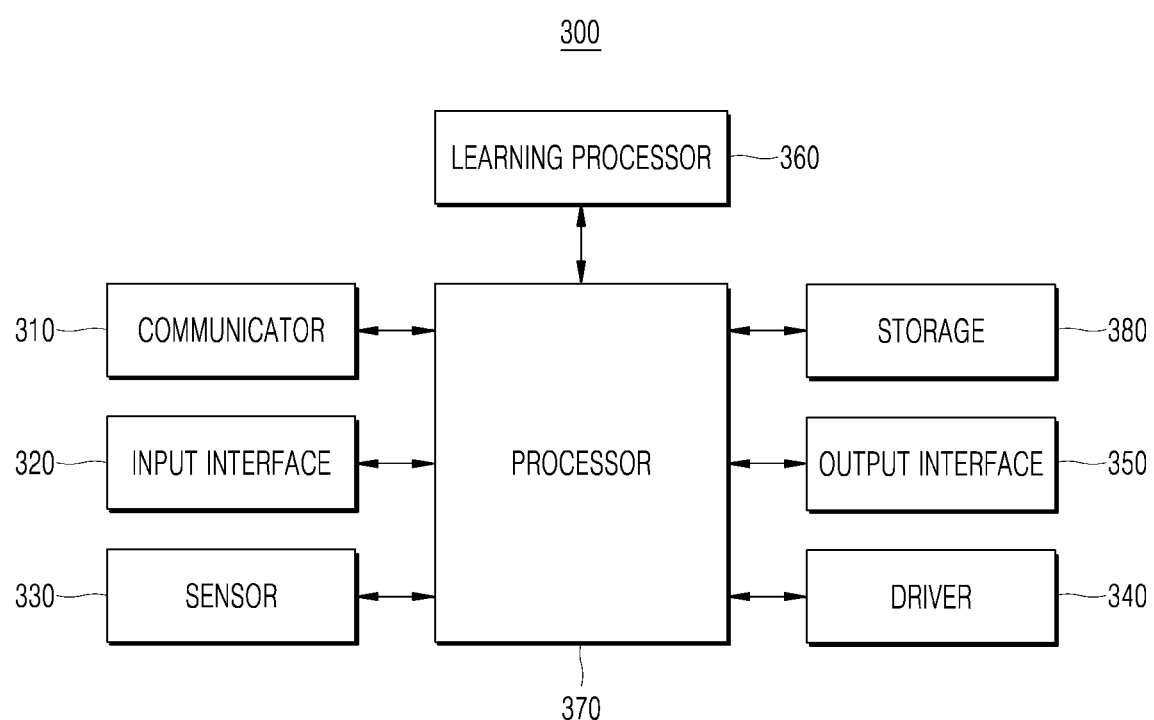
FIG. 3 is a block diagram illustrating a configuration of a robot according to one embodiment of the present disclosure.
Figure 4:
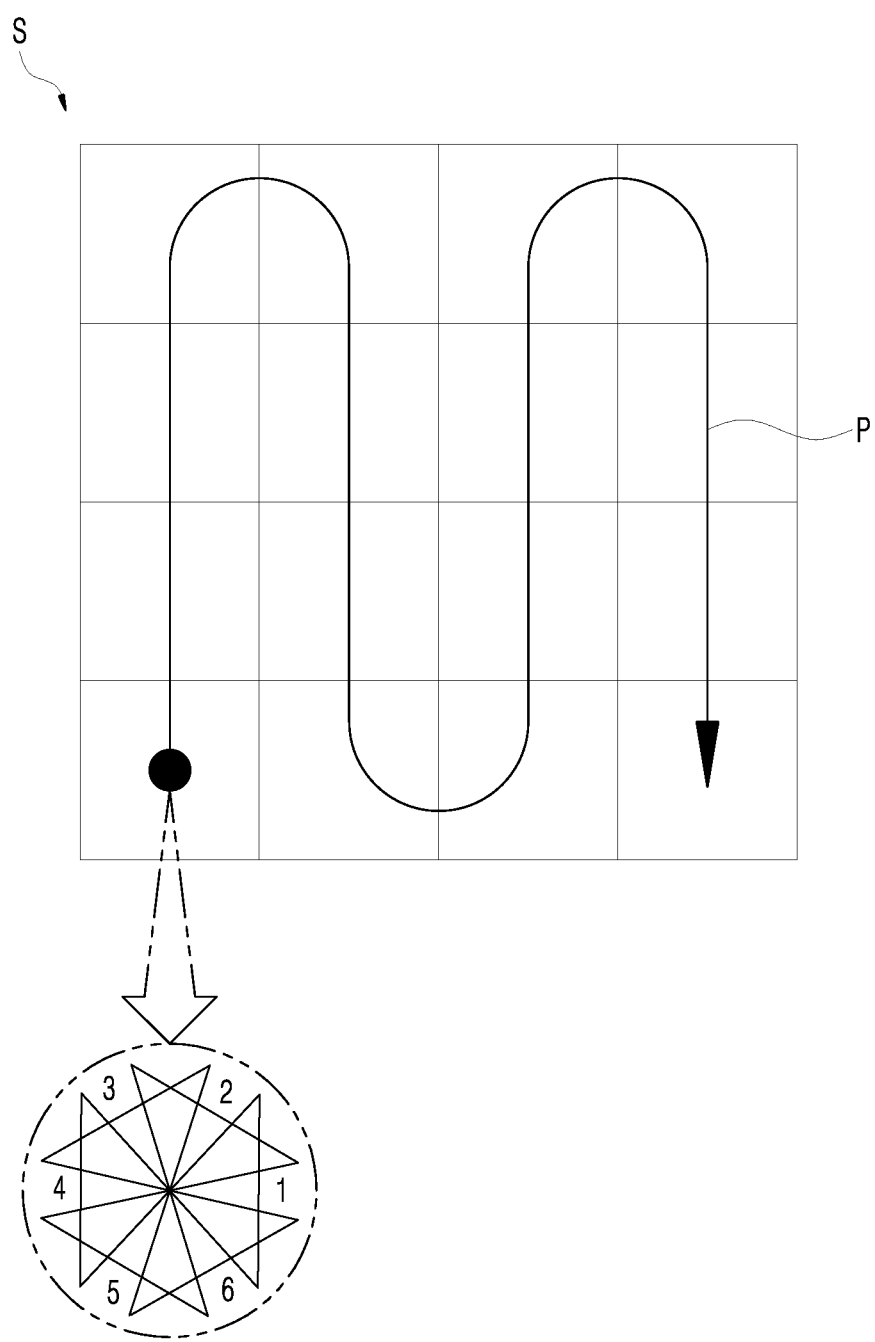
FIG. 4 is a diagram illustrating a learning operation of a mapping robot according to one embodiment of the present disclosure.
Figure 5:
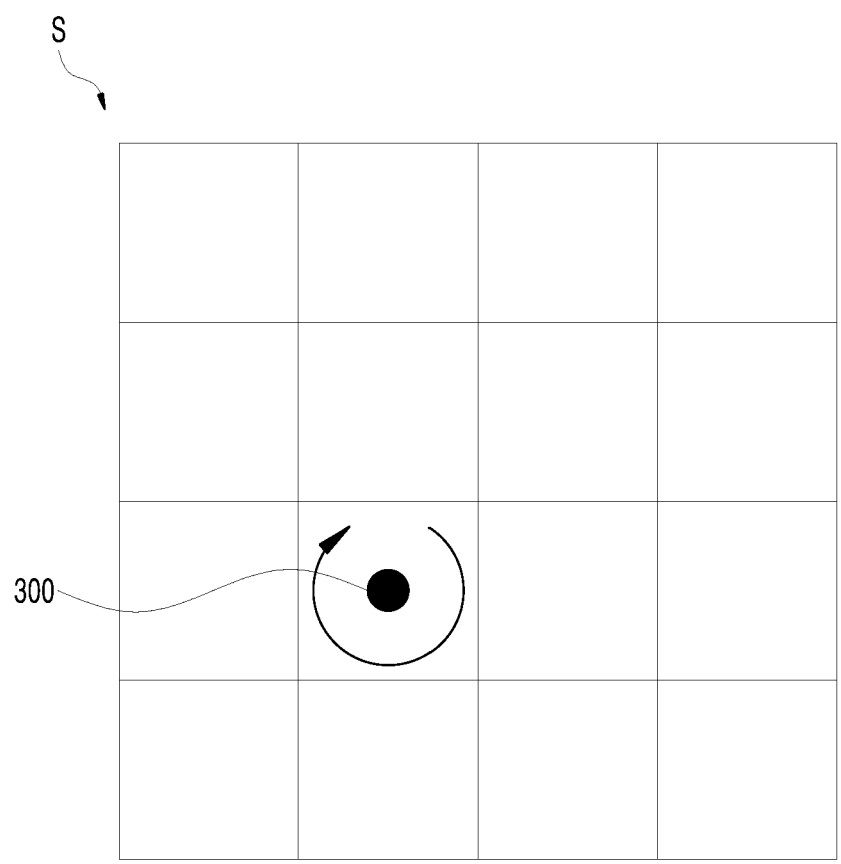
FIG. 5 is a diagram illustrating an operation of localization of a service robot according to one embodiment of the present disclosure.

FIG. 3 is a block diagram illustrating a configuration of a robot according to one embodiment of the present disclosure. FIG. 4 is a diagram illustrating a learning operation of a mapping robot according to one embodiment of the present disclosure. FIG. 5 is a diagram illustrating an operation of localization of a service robot according to one embodiment of the present disclosure.

The robot may be unable to properly recognize its current position or orientation for various reasons. If the robot does not accurately recognize its current position or orientation, the robot may not provide a service desired by the user.

Embodiments of the present disclosure may provide methods by which the robot may effectively estimate its position or its pose with a simple motion that rotates in place (i.e., rotates at a specific point). Embodiments of the present disclosure may provide methods by which the robot may collect training data more efficiently.

In the present disclosure, the 'position' of the robot may represent two-dimensional coordinate information (x, y) of the robot, and the 'pose' of the robot may represent two-dimensional coordinate information and orientation information (x, y, θ). In the present disclosure, the robot may be classified into any one of a mapping robot and a service robot according to a given role. The 'mapping robot' may refer to a robot for creating a map of the space or collecting training data according to a control signal from the control server 120 or the terminal 130, and/or an input signal from a user. The 'mapping robot' may also be referred to as a 'mapper.' The mapping robot may have components with higher performance than the service robot described below. The 'service robot' may refer to a robot for providing a specific service according to a control signal from the control server 120 or the terminal 130, and/or an input signal from the user. The 'service robot' may also be referred to as a 'localizer' from the point of view of localization. The service robot may have components with lower performance than the mapping robot described above.

The robot 300 according to one embodiment may include a communicator 310 (or a communication device), an input interface 320 (or an input device), a sensor 330 (or a sensor device(s)), a driver 340, an output interface 350 (or an output device), a processor 370, and a storage 380 (or a memory). The robot 300 may further include a learning processor 360 configured to perform operations related to artificial intelligence and/or machine learning. The robot of FIG. 3 may represent the mapping robot or the service robot.

The communicator 310 may transmit or receive information or data with external devices such as the control server 120 or the terminal 130 using wired or wireless communication technology. The communicator 310 may transmit or receive sensor information, a user input, a trained model, a control signal, and the like with the external devices. The communicator 310 may include a communicator for transmitting or receiving data, such as a receiver, a transmitter, or a transceiver.

The communicator 310 may use communication technology such as global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), LTE-advanced (LTE-A), wireless LAN (WLAN), wireless-fidelity (Wi-Fi), Bluetooth™, radio frequency identification (RFID), infrared data association (IrDA), ZigBee, near field communication (NFC), visible light communication, and light-fidelity (Li-Fi).

The communicator 310 may use a 5G communication network. The communicator 310 may communicate with external devices such as the control server 120 and the terminal 130 by using at least one service of enhanced mobile broadband (eMBB), ultra-reliable and low latency communication (URLLC), or massive machine-type communication (mMTC).

The eMBB is a mobile broadband service, through which multimedia content, wireless data access, and the like are provided. Improved mobile services such as hotspots and broadband coverage for accommodating the rapidly growing mobile traffic may be provided via eMBB. Through a hotspot, high-volume traffic may be accommodated in an area where user mobility is low and user density is high. Through broadband coverage, a wide-range and stable wireless environment and user mobility may be guaranteed.

The URLLC service defines requirements that are far more stringent than existing LTE in terms of transmission delay and reliability of data transmission or reception. Based on such services, 5G services may be provided for, for example, production process automation at industrial sites, telemedicine, telesurgery, transportation, and safety.

The mMTC is a transmission delay-insensitive service that requires a relatively small amount of data transmission. The mMTC enables a much larger number of terminals (than before) to access the wireless access networks simultaneously.

The communicator 310 may receive a map of a space (or an area) or a trained model from the control server 120, the terminal 130, and/or another robot. The communicator 310 may provide the received map of the space or the trained model to the processor 370 or the learning processor 360. The map of the space or the trained model may be stored in the storage 380.

The input interface 320 may obtain various types of data. The input interface 320 may include at least one camera for obtaining an image signal including an image or a video image, a microphone for obtaining an audio signal, a user interface for receiving information from a user, and/or the like.

The camera of the input interface 320 may obtain (or receive) images of a surrounding environment of the robot 300. The at least one camera may obtain a plurality of successive sequential images. The images obtained by the at least one camera may be provided to the processor 370 or the learning processor 360. When the robot 300 is a mapping robot, the input interface 320 may include a 360 degree camera. When the robot 300 is the service robot, the input interface 320 may include a general front-facing camera.

The input interface 320 may obtain (or receive) training data for training the artificial neural network, input data to be used when obtaining the output using the trained model, and the like. The input interface 320 may obtain raw input data. In this example, the processor 370 or the learning processor 360 may extract an input feature by preprocessing the input data.

The sensor 330 may obtain (or receive) at least one of internal information of the robot 300, surrounding environment information, or user information by using various sensors. The sensor 330 may include an acceleration sensor, a magnetic sensor, a gyroscope sensor, an inertial sensor, a proximity sensor, an RGB sensor, an illumination sensor, a humidity sensor, a fingerprint recognition sensor, an ultrasonic sensor, a microphone, a Lidar sensor, a radar, or any combination thereof. The sensor data obtained by the sensor 330 may be used for autonomous driving of the robot 300 and/or for generating the map of the space.

The driver 340 may physically drive (or move) the robot 300. The driver 340 may include an actuator or a motor that operates according to a control signal from the processor 370. The driver 340 may include a wheel, a brake, a propeller, and the like, which are operated by the actuator or the motor.

The output interface 350 may generate an output related to visual, auditory, tactile and/or the like. The output interface 350 may include a display for outputting visual information, a speaker for outputting auditory information, a haptic module for outputting tactile information, and/or the like.

The storage 380 (or memory) may store data supporting various functions of the robot 300. The storage 380 may store information or data received by the communicator 310, and input information, input data, training data, a trained model, a learning history, and/or the like, obtained by the input interface 320. The storage 380 may include a RAM memory, a flash memory, a ROM memory, an EPROM memory, an EEPROM memory, registers, a hard disk, and/or the like.

The storage 380 may store the map of the space, the trained model, and/or the like, received from the communicator 310 and/or the input interface 320. The map of the space or the trained model may be received in advance from the control server 120 or the like and stored in the storage 380, and may be periodically updated.

The learning processor 360 may train a model composed of an artificial neural network using training data. The trained artificial neural network may be referred to as a trained model. The trained model may be used to infer a result value with respect to new input data rather than training data, and the inferred value may be used as a basis for judgment to perform an operation.

In an embodiment, when the robot 300 is the mapping robot, the learning processor 360 may train the artificial neural network using, as the training data, a set (or plurality) of reference images for a specific point and a global position or a global pose of the specific point, obtained by the input interface 320. In an embodiment, when the robot 300 is the service robot, the learning processor 360 may determine the position or the pose corresponding to the query image, using the at least one query image obtained by the input interface 320 as input data for the trained model based on the artificial neural network.

The learning processor 360 may perform artificial intelligence and/or machine learning processing together with the learning processor 225 of the AI server 220 of FIG. 2. The learning processor 360 may include a memory integrated into or implemented in the robot 300. Alternatively, the learning processor 360 may also be implemented by using the storage 380, an external memory directly coupled to the robot 300, or a memory held in the external device.

The processor 370 may determine at least one executable operation of the robot 300, based on information determined or generated using a data analysis algorithm or a machine learning algorithm. The processor 370 may control components of the robot 300 to perform the determined operation.

The operation of the processor 370 may be described with reference to FIGS. 4 and 5. A mode of operation may vary according to whether the robot 300 is the mapping robot or the service robot. A learning operation by the mapping robot is first described with reference to FIG. 4, and an operation of localization by the service robot is described with reference to FIG. 5.

Learning By the Mapping Robot

A space (or an area) in which the robot 300 operates may be partitioned into a plurality of grids. Each of the plurality of grids may have the same shape and the same area. The shape or area of each grid may be variously selected according to, for example, the area or property of the space, a size or area of the robot 300, or a design purpose. As one example, FIG. 4 shows a space S including sixteen grids. In another embodiment, the plurality of grids may include at least one grid having different shapes and/or different areas according to constraints on the physical space or the design purpose, for example.

The processor 370 of the mapping robot may set a mapping path for collecting training data. As shown in FIG. 4, the processor 370 may set the mapping path P to cover all the grids in the space S. However, embodiments of the present disclosure are not limited thereto, and various mapping paths that may cover all grids may also be set. As described above, the shape or area of the grid may be variously selected, and accordingly, the shape of the mapping path may also be appropriately changed.

The processor 370 may control the driver 340 to move the robot 300 along the mapping path. The processor 370 may collect training data at specific points on the mapping path. In an embodiment, the input interface 320 of the mapping robot may include a 360 degree camera capable of obtaining an image spanning 360 degrees (or extending across 360 degrees). The processor 370 may receive, from the input interface, a reference image spanning 360 degrees (or covering 360 degrees at specific points on the mapping path. The specific points may be points on the mapping path that are spaced at predetermined intervals. Spacing between specific points may be variously selected according to the property of the space S and the design purpose, for example.

The reference image spanning 360 degrees may be a set of a plurality of successive reference images covering a field of view at a predetermined angle. For example, as shown in FIG. 4, the set of reference images may include six successive reference images, each covering a 60 degree field of view 1, 2, 3, 4, 5, 6. In an embodiment, the set of reference images may include all order and/or direction combinations of the reference images. For example, referring to FIG. 4, the set of reference images is, in the counterclockwise direction, a first order (1→2→3→4→5→6), a second order (2→3→4→5→6→1), . . . , and a sixth order (6→1→2→3→4→5). This may be applied equally to the clockwise direction.

The processor 370 may generate reference information on the reference images and store the generated reference information in the storage 380. The reference information may include information on at least one of information on the angle covered by each reference image, information on the order and the direction of the reference images, the number of cameras used to obtain the reference images, the number of key features in the reference image, or the complexity of the reference image derived on the basis of the number of features. The processor 370 may transmit the reference information to the AI server 220. The reference information provided to the AI server 220 may be provided to the service robot and used when determining a localization method of the service robot.

The processor 370 may associate the set of the plurality of reference images obtained at specific points on the mapping path with a global position or pose at that specific point. The set of the plurality of reference images and the corresponding global position or pose may be used as training data for training the artificial neural network.

The processor 370 or the learning processor 360 may train the artificial neural network based on the training data. In another embodiment, the mapping robot may collect training data and transmit the collected training data to the AI server 220. In this example, training of the artificial neural network may be performed by the AI server 220.

The trained model may be trained to output a position or a pose corresponding to at least one image obtained at any point. The trained model may be used for localization of the service robot. The trained model may be implemented by deep learning. The trained model may be implemented by at least partially utilizing any one of trained models for relocalization, known to those skilled in the art, such as PoseNet, PoseNet+LS™, PoseNet+Bi-LS™, PoseSiamNet.

According to embodiments of the present disclosure, the mapping robot may effectively collect the training data on the mapping path, instead of all the paths in the space. Thus, complexity of collecting the training data may be improved.

Localization by Service Robot

As described above, the processor 370 of the service robot may receive, from the AI server 220, a trained model trained by the mapping robot or the AI server 220. The received trained model may be stored in the storage 380. Additionally, the processor 370 of the service robot may receive reference information on the reference images from the AI server 220. The reference information may be generated by the mapping robot and provided to the AI server 220.

As shown in FIG. 5, when localization is required, the processor 370 of the service robot may cause the driver 340 to rotate the robot 300 in place (i.e., at a same point). In an embodiment, the processor 370 may determine a rotation method of the robot 300 based on the reference information received from the AI server 220. Determining the rotation method may include determining at least one of a rotation direction, a rotation speed, and/or a rotation angle.

In one aspect, sets of reference images according to various orders and directions may have been used as training data. That is, the sets of reference images obtained by the mapping robot may have been trained to cover all possible rotation direction and rotation angle combinations of the service robot. In this example, the processor 370 of the service robot may rotate the robot 300 by any angle in any direction from any position. The processor 370 does not need to consider an initial position or an initial orientation for rotation. The processor 370 may freely rotate the robot 300 in place (or at a specific point). A standard scheme that may be commonly used by the service robot may be predetermined. In this example, the processor 370 may rotate the robot 300 according to the predetermined standard scheme (e.g., 360 degree rotation in a clockwise direction).

In another aspect, the sets of reference images according to a limited order and direction may have been used as the training data. That is, the sets of reference images obtained by the mapping robot may have been trained to cover only a limited combination of the rotation direction and the rotation angle of the service robot. In this example, the processor 370 of the service robot may determine the rotation direction and the rotation angle of the robot 300 based on the reference information on the reference images. In this example, the rotation direction of the robot 300 may be determined according to the direction of the set of reference images used as the training data, and the rotation angle of the robot 300 may be determined according to the angle covered by each reference image or the like.

In another aspect, the processor 370 may adjust the rotation angle and/or the rotation speed of the robot 300 according to specifications or the number of cameras provided in the input interface 320. In an embodiment, the input interface 320 of the service robot may include a front-facing camera that is commonly used. The input interface 320 may include a single camera or may include a plurality of cameras, according to the specifications of the service robot.

The processor 370 may receive, from the input interface 320, a plurality of successive sequential images obtained by the input interface 320 during the rotation of the robot 300. The number of sequential images obtained during the rotation of the robot 300 may be variously selected. In an embodiment, the number of sequential images may be determined according to, for example, the number of reference images in the set of reference images used as training data, the number of cameras used by the mapping robot to obtain reference images, the number or complexity of key features in the reference image.

The processor 370 may estimate a position or a pose of the robot 300 based on a plurality of sequential images obtained during the rotation of the robot 300. In an embodiment, the processor 370 may estimate the position or the pose of the robot 300 by inputting the plurality of sequential images to the trained model stored in the storage 380. The trained model may output the position or the pose corresponding to the plurality of sequential images. The processor 370 may determine the position or the pose outputted by the trained model as the current position or the pose of the robot 300.

In another embodiment, the trained model may be stored at the AI server 220. The processor 370 of the service robot may transmit the plurality of sequential images obtained during the rotation of the robot 300 to the AI server 220 having the trained model. The trained model of the AI server 220 may output a specific position or pose in a space, corresponding to the plurality of sequential images. The processor 370 may obtain, from the AI server 220 through the communicator 310, the position estimated by the trained model of the AI server 220.

According to embodiments of the present disclosure, the service robot may effectively estimate its position or pose with only a simple motion of rotating in place (or at a specific point). Additionally, since localization is possible through the rotation in place, dangerous driving of a robot that does not identify its position may be avoided.

Figure 6:
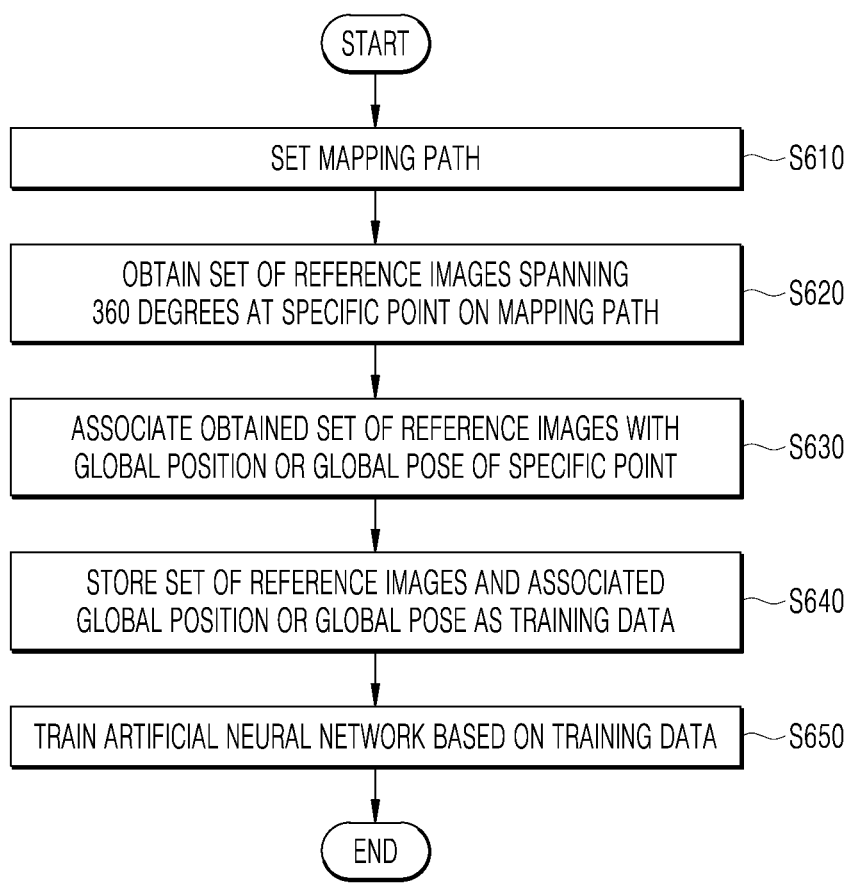
FIG. 6 is a flowchart illustrating a learning method by a robot according to one embodiment of the present disclosure.

FIG. 6 is a flowchart illustrating a learning method by a robot according to one embodiment of the present disclosure. The method shown in FIG. 6 may be performed by a mapping robot.

In step S610, the mapping robot sets a mapping path for collecting training data. The mapping path may be set to cover all grids in the space. An appropriate mapping path may be selected according to the shape or the area of the grid.

In step S620, the mapping robot may obtain a set of reference images spanning 360 degrees at a specific point on the mapping path. The set of reference images may be obtained by a 360 degree camera provided at the mapping robot. The set of reference images may include a plurality of successive reference images covering a field of view of a predetermined angle. In an embodiment, the set of reference images may include all possible order and/or direction combinations of the reference images.

In step S630, the mapping robot may associate the set of reference images obtained at the specific point with a global position or a global pose of that point. In step S640, the mapping robot may store the set of reference images and the global position or global pose as the training data for training an artificial neural network.

In step S650, the mapping robot may train the artificial neural network based on the training data. The trained model may be trained to output a position or a pose corresponding to at least one image obtained at any point. The trained model may be used for localization of the service robot. Step S650 may be performed by a server other than the mapping robot. In this example, the mapping robot may transmit the stored training data to the server.

Figure 7:
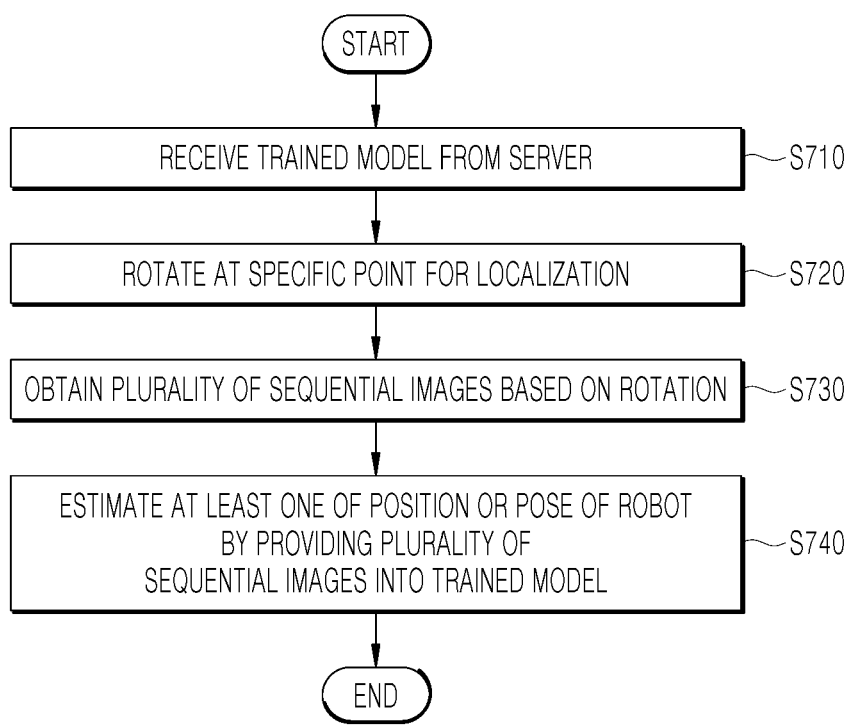
FIG. 7 is a flow chart illustrating a method for localizing a robot according to one embodiment of the disclosure.

FIG. 7 is a flow chart illustrating a method for localizing a robot according to one embodiment of the disclosure. The method shown in FIG. 7 may be performed by a service robot.

In step S710, the service robot may receive a trained model from a server. The trained model may be trained by a mapping robot or server. The received trained model may be stored in the service robot.

In step S720, the service robot may rotate in place (or at a specific point) for localization. The service robot may rotate in any direction at any position. In step S730, the service robot may obtain (or receive) a plurality of sequential images during the rotation. The plurality of sequential images may be obtained by a front-facing camera provided in the service robot. The number of sequential images obtained during one rotation of the service robot may be variously selected.

In step S740, the service robot may estimate at least one of its position or its pose based on inputting the plurality of sequential images obtained during the rotation into the trained model. The trained model may output a position or a pose corresponding to the plurality of sequential images. The service robot may determine the position or the pose outputted by the trained model as its current position or pose.

In at least one embodiment, step S710 may not be performed. In other words, the trained model may be stored in the server. In this example, the service robot may transmit the plurality of sequential images obtained during the rotation to the server having the power model. The trained model of the server may output a specific position or pose in a space, corresponding to the plurality of sequential images. The service robot may receive, from the server, the position estimated by the trained model of the server.

Example embodiments described above may be implemented in the form of computer programs executable through various components on a computer, and such computer programs may be recorded on computer-readable media. Examples of the computer-readable media may include, but are not limited to: magnetic medium such as hard disk, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of computer programs may include both machine codes, such as produced by a compiler, and higher level codes that may be executed by the computer using an interpreter.

As used in the present disclosure (and in the appended claims), the terms "a/an" and "the" may include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

An aspect of the present disclosure is to provide methods for improving the complexity of a trained model for localization and for simplifying an operation of a robot for localization. Another aspect of the present disclosure is to provide methods for enabling a robot that does not identify its position to avoid dangerous driving.

Aspects of the present disclosure is not limited to those mentioned above, and other aspects and advantages not mentioned above will be understood from the following description, and become more apparent from the exemplary embodiments. Moreover, aspects and advantages of the present disclosure may be realized by the means and combinations thereof indicated in claims.

According to one embodiment of the present disclosure, a robot may be configured to rotate in place for localization, and estimate at least one of a position or a pose in a space, based on a plurality of sequential images obtained during the rotation. The position or pose of the robot may be estimated based on inputting the plurality of sequential images obtained during the rotation of the robot into a trained model based on an artificial neural network.

According to one embodiment of the present disclosure, a robot may include an input interface configured to obtain an image of a surrounding environment of the robot; and at least one processor configured to rotate the robot in place for localization, and estimate at least one of a position or a pose in a space, based on a plurality of sequential images obtained by the input interface during the rotation of the robot. The position or pose of the robot may be estimated based on inputting the plurality of sequential images obtained during the rotation of the robot into trained model based on an artificial neural network.

The trained model may output a position or a pose of the robot corresponding to the plurality of sequential images obtained during the rotation of the robot. The trained model may be trained using, as training data, a set of reference images obtained by a 360 degree camera at each of specific points in the space, and a global position or a global pose of each of the specific points. The set of reference images may include a plurality of successive reference images, each covering a field of view of a predetermined angle. The set of reference images may include all possible order and direction combinations of the reference images. The trained model may be a trained model stored in the robot or a trained model stored in a server.

According to another embodiment of the present disclosure, a robot may include an input interface configured to obtain a set of reference images spanning 360 degrees, of a surrounding environment of the robot, and at least one processor configured to: associate the set of reference images obtained by the input interface at a specific point in a space with a global position or a global pose of the specific point, and store, as training data, the set of reference images and the associated global position or global pose.

The at least one processor may be further configured to train a trained model based on an artificial neural network, on the basis of the training data. The trained model may be trained to output a position or a pose corresponding to at least one image obtained at the specific point, and the trained model may be provided to at least one service robot in the space. The at least one processor may be further configured to divide the space into a plurality of grids, set a mapping path to cover all of the divided grids, and move the robot along the set mapping path. The specific point may be a point on the mapping path. The set of reference images may include a plurality of successive reference images, each covering a field of view of a predetermined angle. The set of reference images may include all possible order and direction combinations of the reference images. The input interface may include a 360 degree camera.

According to one embodiment of the present disclosure, a method for localizing a robot may include rotating the robot in place for localization; obtaining a plurality of sequential images during the rotation; and estimating at least one of a position or a pose of the robot in a space, based on inputting the plurality of sequential images obtained during the rotation into a trained model based on an artificial neural network.

According to one embodiment of the present disclosure, a method of learning by a robot may include obtaining a set of reference images spanning 360 degrees, of a surrounding environment of the robot using a 360 degree camera at a specific point in a space; associating the obtained set of reference images with a global position or a global pose of the specific point; and storing, as training data, the set of reference images and the associated global position or global pose. The method may further include training a trained model based on an artificial neural network, on the basis of the training data.

According to embodiments of the present disclosure, a mapping robot may collect training data more efficiently, thereby improving the complexity of learning. According to embodiments of the present disclosure, the robot may effectively estimate its position or pose with a simple motion of rotating in place. According to embodiments of the present disclosure, dangerous driving of the robot that does not identify its position may be avoided.

Embodiments disclosed in the present disclosure will be described in detail with reference to appended drawings, where the same or similar constituent elements are given the same reference number irrespective of their drawing symbols, and repeated descriptions thereof will be omitted. As used herein, the terms "module" and "unit" used to refer to components are used interchangeably in consideration of convenience of explanation, and thus, the terms per se should not be considered as having different meanings or functions. In addition, in describing an embodiment disclosed in the present disclosure, if it is determined that a detailed description of a related art incorporated herein unnecessarily obscure the gist of the embodiment, the detailed description thereof will be omitted. Furthermore, it should be understood that the appended drawings are intended only to help understand embodiments disclosed in the present disclosure and do not limit the technical principles and scope of the present disclosure; rather, it should be understood that the appended drawings include all of the modifications, equivalents or substitutes described by the technical principles and belonging to the technical scope of the present disclosure.

It will be understood that when an element is referred to as being "connected to," "attached to," or "coupled to" another element, it may be directly connected, attached, or coupled to the other element, or intervening elements may be present. In contrast, when an element is referred to as being "directly connected to," "directly attached to," or "directly coupled to" another element, no intervening elements are present.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
an input device configured to receive an image of an environment of the robot; and
at least one processor configured to:
determine an image obtaining characteristic for obtaining images during a rotation method, the determined image obtaining characteristic is based on reference information of a set of reference images stored on a memory,
rotate the robot at a specific point for localization based on the determined image obtaining characteristic during the rotation method,
obtain, by the input device, a plurality of sequential images based on the determined image obtaining characteristic during the rotation of the robot,
inputting the plurality of sequential images to a trained model based on an artificial neural network, and
estimate at least one of a position and a pose of the robot at the specific point based on the plurality of sequential images inputted to the trained model,
wherein the trained model is trained to associate the set of reference images acquired from at least one location with a global position or a global pose of the at least one location, and
the reference information includes at least one of image obtaining information on an angle covered by each of the plurality of reference images, image obtaining information on an order and a direction of the plurality of reference images, image obtaining information regarding a number of cameras used to obtain the plurality of reference images, and image obtaining information regarding a number of key features in the plurality of reference images and complexity of the reference images derived based on the number of key features.

2. The robot of claim 1, wherein the trained model is configured to output a position or a pose of the robot corresponding to the specific point where the robot is located.

3. The robot of claim 1, wherein the trained model is to use training data, the training data including:
a plurality of sets of reference images obtained by a mapping robot or a server at each of a plurality of specific points, and
the global position or the global pose of each of the plurality of specific points.

4. The robot of claim 3, wherein the set of reference images includes a plurality of successive reference images, each of the successive reference images covers a field of view at a predetermined angle with respect to the robot.

5. The robot of claim 4, wherein the set of reference images includes at least one possible order and direction combination of the plurality of reference images.

6. The robot of claim 3, wherein the rotation method is based on at least one of a rotation direction of the robot, a rotation angle of the robot and a rotation speed of the robot based on the reference information.

7. The robot of claim 1, wherein the trained model is to be stored in the robot or is to be stored in a server.

8. A method of localizing a robot comprising:
- determining an image obtaining characteristic for obtaining images during a rotation method, the determined image obtaining characteristic is based on reference information of a set of reference images stored on a memory;
- rotating the robot at a specific point for localization based on the determined image obtaining characteristic during the rotation method;
- receiving a plurality of sequential images based on the determined image obtaining characteristic during the rotating of the robot;
- inputting the plurality of sequential images to a trained model based on an artificial neural network; and
- estimating at least one of a position and a pose of the robot at the specific point based on the plurality of sequential images inputted to the trained model,
- wherein the trained model is trained to associate the set of reference images acquired from at least one location with a global position or a global pose of the at least one location, and
- the reference information includes at least one of image obtaining information on an angle covered by each of the plurality of reference images, image obtaining information on an order and a direction of the plurality of reference images, image obtaining information regarding a number of cameras used to obtain the plurality of reference images, and image obtaining information regarding a number of key features in the plurality of reference images and complexity of the plurality of reference images derived based on the number of key features.

9. The method of claim 8, wherein the trained model is to output a position or a pose of the robot corresponding to the plurality of sequential images received during the rotation of the robot.

10. The method of claim 8, wherein the trained model is to use training data, the training data including:
- a plurality of sets of reference images obtained by a mapping robot or a server at each of a plurality of specific points, and
- a global position or a global pose of each of the plurality of specific points.

11. The method of claim 10, wherein the trained model is to be stored in the robot or is to be stored in a server.

12. The method of claim 8, wherein the set of reference images includes a plurality of successive reference images, each of the successive reference images covers a field of view at a predetermined angle with respect to the robot.

13. The method of claim 12, wherein the set of reference images includes at least one possible order and direction combination of the plurality of reference images.

* * * * *